United States Patent
Okada

[19]
[11] Patent Number: 5,909,287
[45] Date of Patent: *Jun. 1, 1999

[54] IMAGE PROCESSING APPARATUS AND METHOD

[75] Inventor: Masaaki Okada, Toda, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/610,089

[22] Filed: Feb. 29, 1996

[30] Foreign Application Priority Data

Mar. 2, 1995 [JP] Japan ..................................... 7-068611

[51] Int. Cl.⁶ .................................................. H04N 1/40
[52] U.S. Cl. .......................................... 358/461; 358/448
[58] Field of Search .................................... 358/456, 461, 358/455, 448, 433, 466, 463, 518, 521, 523, 530; 382/282, 162, 167, 169

[56] References Cited

U.S. PATENT DOCUMENTS 4,594,733  6/1986  Kanzaki et al. ........................... 382/50
5,208,873  5/1993  Nakajima ................................... 382/50

*Primary Examiner*—Jerome Grant, II
*Attorney, Agent, or Firm*—Morgan & Finnegan LLP

[57] ABSTRACT

A document serving as a white reference (a reference white background) is read to create shading data, the shading data are stored, the checksum of these shading data is obtained and this value also is stored. The checksum of the stored shading data is obtained before the document is read, and this obtained value of the checksum is compared with the already stored value of the checksum of the shading data. If the values of both checksums are found to coincide as a result of the comparison, image processing using the stored shading data is executed. If the values of both checksums do not coincide, however, image processing using shading data having a fixed value is executed.

51 Claims, 10 Drawing Sheets

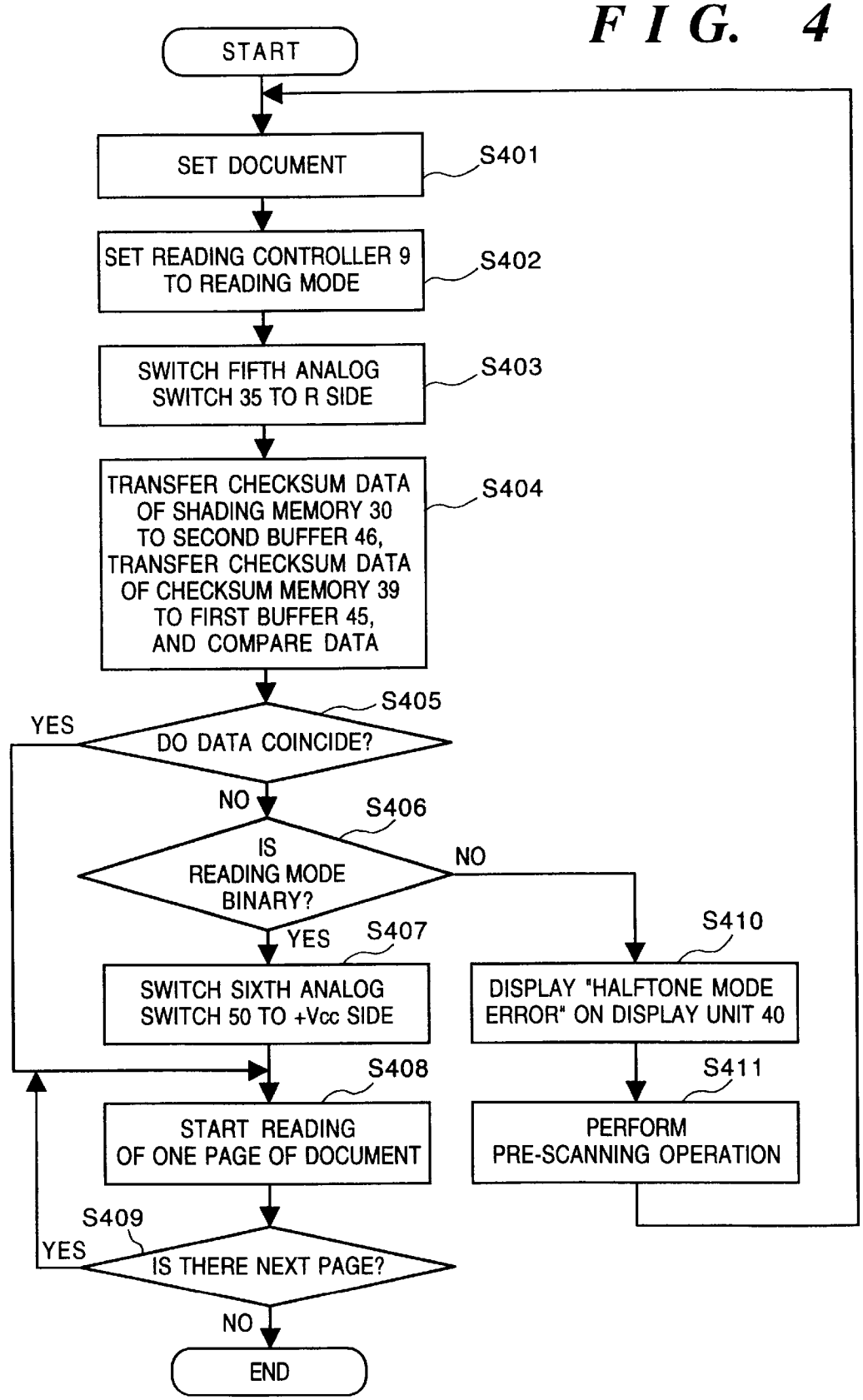

READING LINE a
b

DOCUMENT

PEAK

- - - - REFERENCE SIGNAL
——— VIDEO SIGNAL a
b

- - - - REFERENCE SIGNAL
——— VIDEO SIGNAL
——— SLICE LEVEL

IMAGE PROCESSING APPARATUS AND METHOD

BACKGROUND OF THE INVENTION

This invention relates to an image processing apparatus and method for reading the image of a document by an image sensor and electrically processing the image.

The operation of an image processing apparatus according to the prior art will be described with reference to FIGS. 6 and 7. In order to store a shading waveform for a shading correction before reading one page of a document image, a pre-scanning operation for reading a white background (a reference white background) is performed within the apparatus.

More specifically, an analog switch 14p in the circuit shown in FIG. 7 is closed by an ABC (automatic background control) range signal 33 so that a video signal 11 enters the (+) input terminal of a comparator 15p. Meanwhile, since an analog switch 35p is set to a P side (the side of a peak-value signal 20p) by a switch changeover signal 36p, the held peak-value signal 20p is entering the (−) input terminal of the comparator 15p. If, as a result of comparing these signals, it is found that the video signal is greater than the peak-value signal, an analog switch 18p closes so that a peak-hold capacitor 16p is charged via a charging resistor 17p. The peak-value signal 20p rises as a result. Conversely if the video signal is less than the peak-value signal, the analog switch 18p remains open and the peak-value signal 20p does not change. As a result, the peak-value signal 20p eventually coincides with the peak value of the video signal 11p.

The peak-value signal 20p is transmitted to the other circuit elements via a buffer amplifier 21p. Specifically, a comparator 28p compares the video signal 11p entering its (+) input terminal with a reference signal 32p entering its (−) input terminal. If the video signal is greater than the reference signal, a memory write-data signal 29p at the output of the comparator 28p rises to the "1" (high) logic level. Conversely, if the video signal is less than the reference signal, the memory write-data signal 29p at the output of the comparator 28p falls to the "0" (low) logic level.

In this pre-scanning mode, the memory write-data signal 29p outputted by the comparator 28p is written in a shading memory 30p in response to a memory control signal 34p and, at the same time, is outputted as a memory readout-data signal 31p. As a result, if the memory readout-data signal 31p is at logical "1" (high), an analog switch 24p closes and an analog switch 25p opens. The video-peak signal 20p charges a shading capacitor 22p via the buffer amplifier 21p and a charging resistor 23. Conversely, if the memory readout-data signal 31p is at logical "0" (low), the analog switch 24p opens, the analog switch 25p closes and the shading capacitor 22p discharges via a discharge resistor 27p.

By repeating the charging and discharging of the shading capacitor 22p in the manner described above, a signal waveform in which the video signal waveform of the line presently being read is approximated by the charging/discharging characteristic of the shading capacitor 22p appears on the reference signal 32p and, at the same time, data (shading data) relating to this charging and discharging accumulate in the shading memory 30p. Since the charging of the peak value in the peak-hold capacitor 16p usually takes time, the foregoing pre-scanning operation is repeated over several lines to obtain the shading data. Though it is possible to back up the shading memory 30p, the fact that the shading memory is not connected to the data bus of the overall system means that an MPU 10p cannot access the memory directly. Consequently, the memory cannot be provided with protection.

FIGS. 8A and 8B are diagrams schematically showing an operation for obtaining a shading waveform, which takes into account a variance in the amount of light of the reading light source and a variance in the sensitivity of the reading sensor, by the conventional pre-scanning of white background (reference white background). FIG. 8A illustrates the white background and FIG. 8B the shading waveform.

After the above-described pre-scanning operation is carried out, a transition is made to an operation for reading the actual image of the document. More specifically, the ABC range signal 33p closes the analog switch 14p within the ABC range with respect to the width of the document. Here it is assumed that the analog switch 14p is closed during the reading of the document by reason of the fact that the width of the document is equal to the ABC range.

Accordingly, the video signal 11p reaches the (+) input terminal of the comparator 15p. At reading of the document, the analog switch 35p is set to the R side (the side of the reference signal 32p) by the switch changeover signal 36p so that reference signal 32p enters the (−) input terminal of the comparator 15p. Operation is such that the video signal 11p and reference signal 32p coincide owing to the switching of the analog switch 18p, in a manner similar to that described above, based upon the comparison of the two signals applied to the comparator 15p.

Meanwhile, shading correction data already accumulated is read out of the shading memory 30p every reading line in sync with the line by the memory control signal 34p, the analog switches 24p, 25p are switched in accordance with the "1" (high), "0" (low) logic of the shading data, and the shading waveform obtained at the time of pre-scanning is reproduced on the reference signal 32p by the charging and discharging of the shading capacitor 22p.

The reference signal 32p thus obtained enters the reference (REF) input terminal of an A/D converter 8p in FIG. 6. The video signal 11p, on the other hand, enters the analog (Vin) input terminal of the A/D converter 8p. As a result, accurate binary image data corrected for shading are obtained and the data are applied to a reading controller 9p.

Accordingly, in case of a document in which portions a and b are black information, as shown in FIG. 9A, the reference signal 32p prevailing when the document is read becomes a waveform having a curve along peak value of the video signal 11p, as illustrated in FIG. 9B. If 60% of the crest value of reference signal 32p is adopted as the slice level in the reading controller 9p of FIG. 6, then, in case of the document of FIG. 9A in which portions a and b are black information, the portions a, b will be lower than the slice level, as depicted in FIG. 9C, and will be judged to be portions of black information.

The above-described operation for reading one line is repeated in the sub-scan (line) direction, whereby one page is read.

In the conventional apparatus described above, the reading processing mechanism for the pre-scanning of the white background (reference white background) is provided within the apparatus. This results in a complicated arrangement within the apparatus and detracts from the reliability with which the document is passed through the apparatus (e.g., in the reliability of the ADF, or automatic document feeder). In addition, in an image processing apparatus of the type in which shading data obtained by a single pre-scanning operation are stored in the shading memory 30p and the shading data are used permanently in subsequent processing, a normal halftone image will not be obtained in the event that the internal data of the shading memory 30p are destroyed by an abnormal voltage (e.g., a lightning surge, a built-up of static electricity, etc.).

SUMMARY OF THE INVENTION

Accordingly, an object of the present invention is to provide an image processing apparatus and method in which the reliability of document feed is enhanced thanks to a simple construction, and in which a normal image can be outputted with regard to both a binary image and a halftone image even if shading data are destroyed.

According to the present invention, the foregoing object is attained by providing an image processing apparatus for electrically processing and outputting an image signal obtained by optically reading a document, comprising means for reading a document serving as a white reference and creating the shading data, first storing means for storing shading data, means for subjecting the shading data to a first calculation, second storing means for storing data obtained by the first calculation, means for subjecting the shading data, which have been stored in the first storing means, to a second calculation before reading of the document starts, and means for comparing the data stored in the second storing means and data obtained by the second calculation, wherein image processing using the shading data is executed in a case where the data stored in the second storing means and the data obtained by the second calculation are found to coincide as a result of comparison of the data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a flowchart showing a document reading operation in the image processing apparatus of this embodiment;

DESCRIPTION OF THE PREFERRED EMBODIMENT

Figure 1:
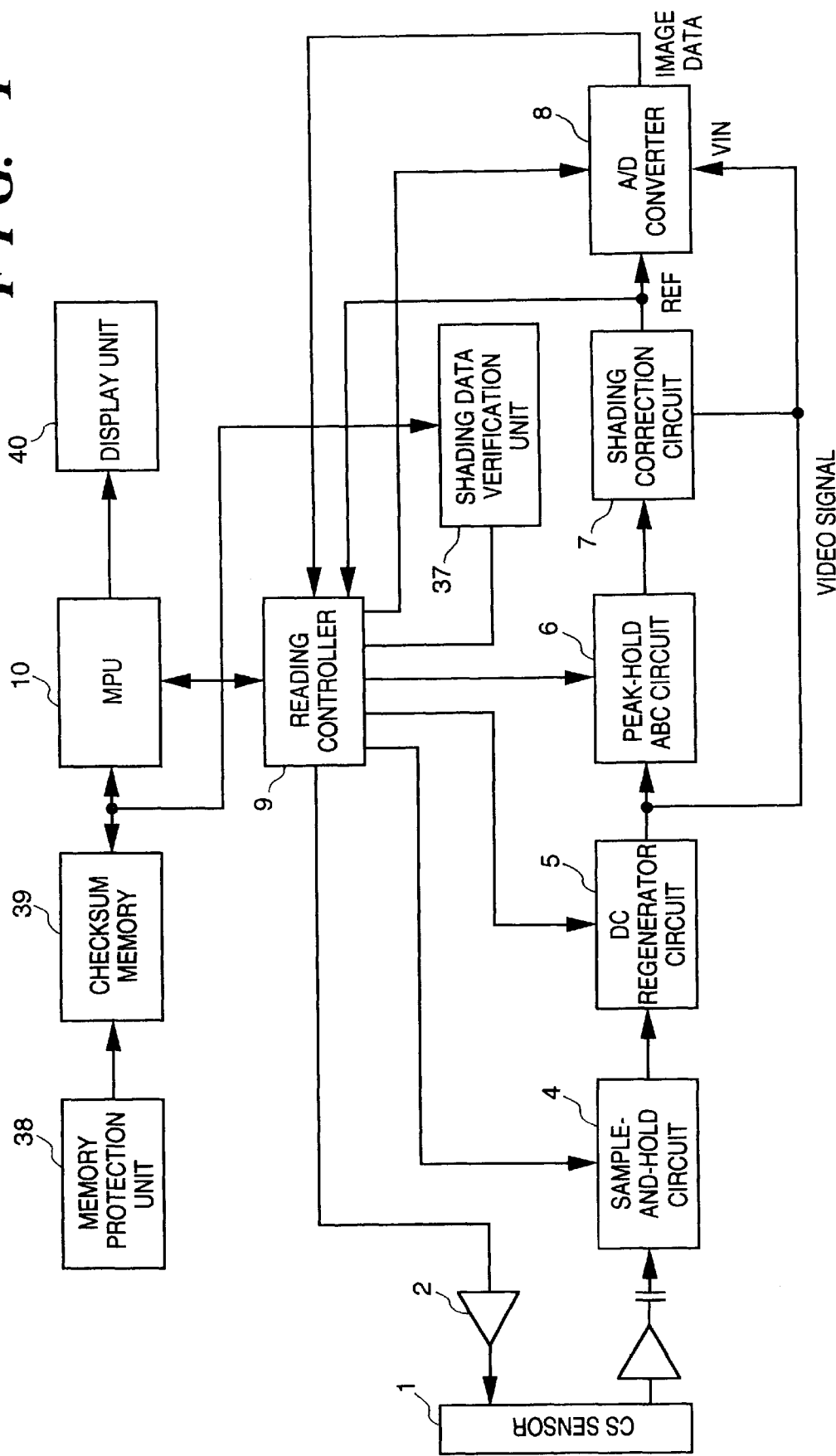
FIG. 1 is a block diagram showing the construction of an image processing apparatus according to an embodiment of the present invention.

An embodiment of the present invention will be described with reference to the drawings. FIG. 1 is a block diagram showing the construction of an image processing apparatus according to an embodiment of the present invention. As shown in FIG. 1, the image processing apparatus of this embodiment has a CS sensor 1 as means for reading a document. The CS sensor mainly improves the performance of the sensor which reads at a magnification of 1×.

A driver circuit 2 supplies a clock signal for driving the CS sensor 1, and an amplifier circuit 3 amplifies the output of the CS sensor 1 to an appropriate level. The CS sensor 1 produces an output signal bit by bit (pixel by pixel). A sample-and-hold circuit 4 extracts from this output signal only an output portion corresponding to the document image. The signal sampled and held by the sample-and-hold circuit 4 is applied to a DC regenerator circuit 5, which proceeds to make the black output level of the document image coincide with the bias voltage of the processing circuitry. A peak-hold ABC circuit 6 detects the peak value of the output during the reading of one line in order that image binarization processing may be executed while taking into consideration the background density of the document image. Since the output signal may be rendered non-uniform (giving rise to so-called "shading distortion") by a variance in the light-receiving sensitivity of the CS sensor 1 and by a mechanical offset in the reading mechanism, a shading correction circuit 7 is provided to correct for this electrically. An A/D (analog-to-digital) converter 8 uses a reference signal, which is produced by the peak-hold ABC circuit 6 and shading correction circuit 7, to binarize the video signal after it has been processed by the DC regenerator circuit 5. The A/D converter 8 outputs the binarized video signal as image data. A reading controller 9 manages and controls the clock timing of each component as well as control-signal timing, accepts the image data binarized by the A/D converter 8 and eventually subjects the data to image processing. An MPU (microprocessing unit) 10 controls the overall apparatus, inclusive of the reading controller 9.

A shading data verification unit 37 subjects the shading data in a shading memory (described later) to a summation check before reading of a document starts, and verifies whether the checksum value coincides with a value stored in a checksum memory 39. The result of verification is entered into the reading controller 9. A memory protection unit 38 protects the data that are being held in the checksum memory 39. (Protection is performed by arranging it so that a chip-select signal will not enter the memory 39.) The checksum memory 39 stores the data resulting from the summation check. A display unit 40 comprising a liquid-crystal cell or the like displays various information on its display screen.

Figure 2:
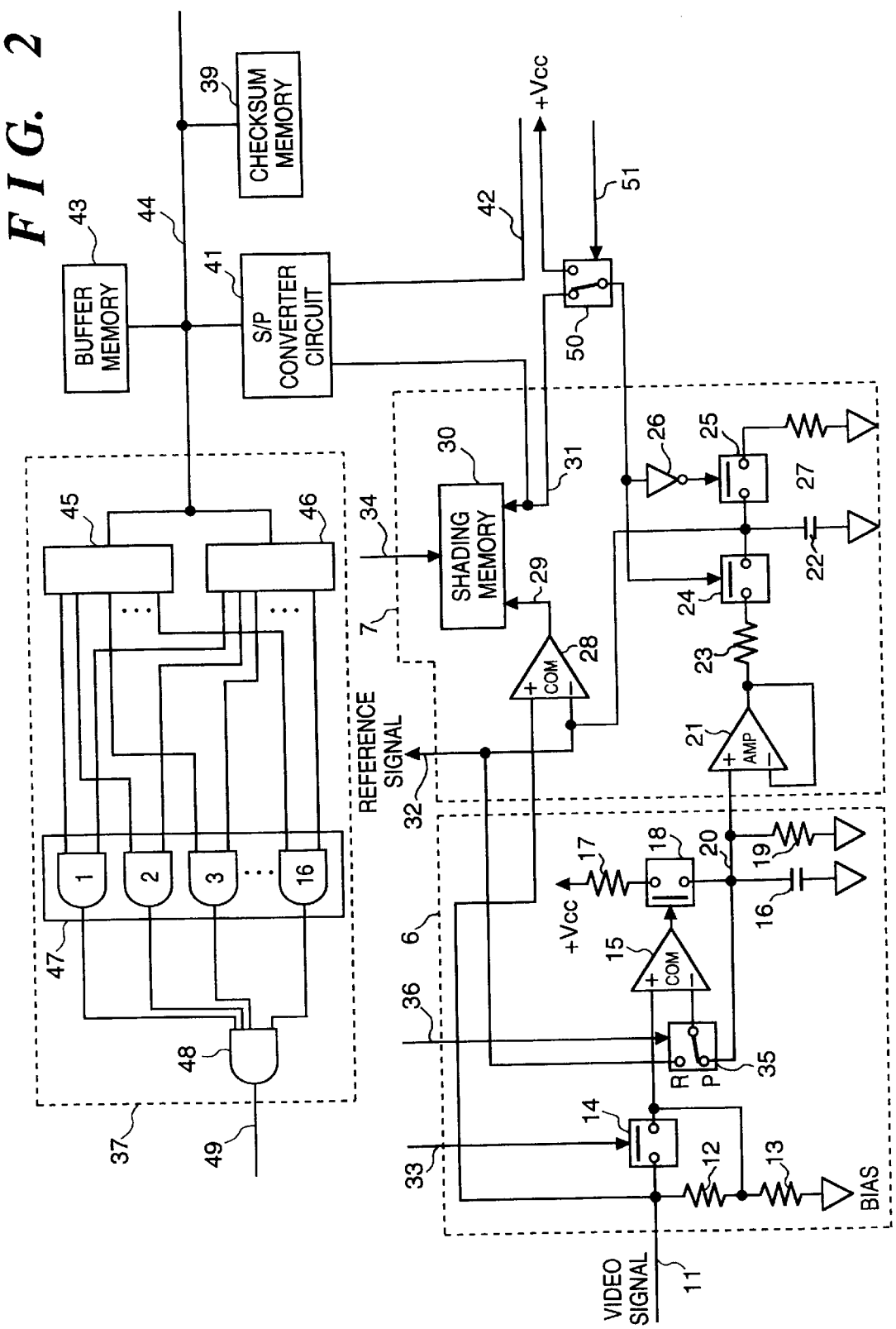
FIG. 2 is a block diagram showing the construction of a peak-hold ABC circuit, a shading correction circuit and shading data verification means in the image processing apparatus of this embodiment.

FIG. 2 is a block diagram showing the construction of the peak-hold ABC circuit 6, the shading correction circuit 7 and the shading data verification unit 37 in the image processing apparatus of FIG. 1.

With reference to FIG. 2, a video signal 11 is the signal outputted by the DC regenerator circuit 5 in FIG. 1. Voltage dividing resistors 12, 13 divide the voltage of the video signal 11. A first analog switch 14 is closed in the ABC range, a first comparator (COM) 15 compares the input video signal 11 and the currently prevailing peak value, and a peak-hold capacitor 16 holds the peak value of the input video signal 11. A first charging resistor 17 is for charging the peak-hold capacitor 16. A second analog switch 18 is closed when the peak-hold capacitor 16 is charged. A first discharge resistor 19 is for discharging the peak-hold capacitor 16. Numeral 20 denotes a peak-value signal that appears at the peak-hold capacitor 16.

A buffer amplifier (AMP) 21 amplifies the peak-value signal 20, a second charging resistor 23 is for charging a shading capacitor 22, a third analog switch 24 is closed when the shading capacitor 22 is charged, and a fourth analog switch 25 is closed when the shading capacitor 22 is discharged. An inverter 26 is for inverting a memory readout-data signal 31, described later. A second discharge resistor 27 is for discharging the shading capacitor 22. A second comparator (COM) 28 compares the input video signal 11 and the reference signal. Numeral 29 denotes the output data from the second comparator 28. This is a memory write-data signal.

A shading memory 30 stores shading correction data. Numeral 31 denotes a memory readout-data signal for switching the third and fourth analog switches 24, 25 in accordance with the shading correction data. Numeral 32 denotes a reference signal which appears at the shading capacitor 22. This signal is applied to the reference (REF) input of the A/D converter 8 in FIG. 1. Numeral 33 denotes a control output signal from the reading controller 9 in FIG. 1. This is the ABC range signal, which turns ON in the ABC range. Numeral 34 denotes an output control signal from the reading controller 9 in FIG. 1. This is a memory control signal for controlling read/write of the shading memory 30. A fifth analog switch 35 is for switching the (−) input terminal of the first comparator 15 to the peak-value signal 20 or to the reference signal 32. Numeral 36 denotes a control output signal from the reading controller 9 of FIG. 1. This is a changeover signal for changing over the fifth analog switch 35.

A serial/parallel (S/P) converter circuit 41 is provided in the reading controller 9 of FIG. 1 and converts binary image data 42 (serial data) prevailing when a document is read or the memory readout-data signal 31 to parallel data. A buffer memory 43 holds the output data from the S/P converter circuit 41. The checksum memory 39 stores data representing the result of the summation check applied to the shading data in the buffer memory 43 by the MPU 10 of FIG. 1. The memory is protected by the memory protection unit 38 of FIG. 1 in such a manner that the internal data will not be destroyed even in the event of runaway of the software relating to control of the apparatus. An eight-bit data bus 44 interconnects the components of the system inclusive of the MPU 10 in FIG. 1.

The shading data verification unit 37 has first and second buffers 45, 46 and first and second AND gates 47, 48. The first and second buffers 45, 46 are for temporarily storing data when the checksum data in the checksum memory 39 and the checksum data of the shading data in the shading memory 30 are compared prior to the start of the operation for reading a document. The first buffer 45 holds the checksum data from the checksum memory 39, and the second buffer 46 holds the checksum data of the shading data from the shading memory 30.

The first AND gate 47 is composed of 16 AND gates (the checksum data are composed of two bytes) in order to compare the data of the first and second buffers 45, 46. The second gate 48 is for outputting the result of the comparison from the first AND gate 47 to the reading controller 9 of FIG. 1 as a discrimination signal 49.

A sixth analog switch 50 switches between the memory readout-data signal 31 and +Vcc [the "1" (high) logic level] and applies the signal to which the changeover has been made to the third and fourth analog switches 24, 25.

The operation of the image processing apparatus according to this embodiment will be described next.

Figure 3:
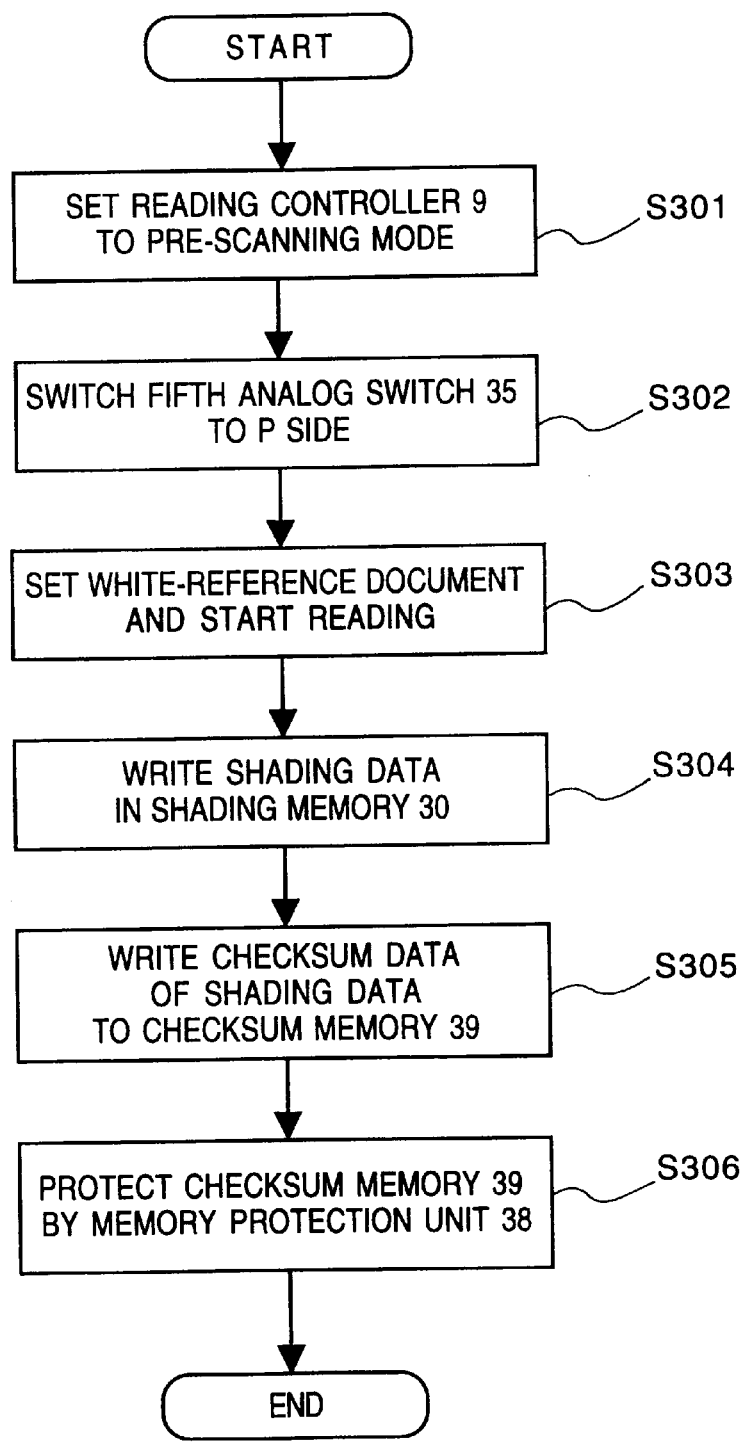
FIG. 3 is a flowchart showing a pre-scanning operation in the image processing apparatus of this embodiment.

First, the operation for generating shading data is carried out in the pre-scanning mode described above. The operation of the pre-scanning mode will be described based upon the flowchart of FIG. 3. First, the reading controller 9 of FIG. 1 is set to the pre-scanning mode (step S301). When a document serving as the white reference is read, the CS sensor 1 outputs the video signal 11, which is fed into the peak-hold ABC circuit 6 after being processed by the DC regenerator circuit 5. Since this mode is the pre-scanning mode, the fifth analog switch 35 is switched over to the P side (the side of the peak-value signal 20) (step S302). The shading data (data of 1728 bits in a case where the document is of letter size), namely the results of comparing the video signal 11 and the reference signal 32, which corresponds to the peak value of the video signal 11, are written in the shading memory 30. At the same time, the shading data are outputted in the form of the memory readout-data signal 31, which enters the S/P converter circuit 41. The S/P converter circuit 41 converts the memory readout-data signal, which is composed of serial data, to parallel data and transfers the parallel data to the buffer memory 43. Here the summation check is performed and the result enters the checksum memory 39 (step S303).

When the reading of the white reference document ends, the writing of the shading data in the shading memory 30 (step S304) has been performed and the writing of the checksum data in the checksum memory 39 (step S305) is completed, the pre-scanning mode ends. The checksum memory 39 is then set to the protect state by the memory protection unit 38 of FIG. 1 (step S306).

Next, reference will be had to the flowchart of FIG. 4 to describe an operation for determining whether the shading data in the shading memory 30 have been destroyed or not. This operation is carried out before the operation for reading a document.

First, the document is set in place at step S401, the reading controller 9 of FIG. 1 is set to the reading mode at step S402 and the fifth analog switch 35 is switched to the R side at step S403. When this is done, the shading data are outputted from the shading memory 30 in the form of the memory readout-data signal 31 in response to the memory control signal 34 outputted by the reading controller 9. Next, at step S404, the shading data are converted to parallel data by the S/P converter circuit 41, the summation check is performed and the result of the check is held in the second buffer 46. Furthermore, the checksum data in the checksum memory 39 are transferred to the first buffer 45. The checksum data (two bytes) in the first and second buffers 45, 46 are compared by the first AND gate 47, and it is determined at step S405 whether these data coincide. If it is determined that all data bits coincide, the output of the second AND gate 48 rises to logical "1" (high). If even one bit of the compared data differs, the output of the second AND gate 48 assumes the "0" (low) logic level and this data enters the reading controller 9.

Figure 5A:
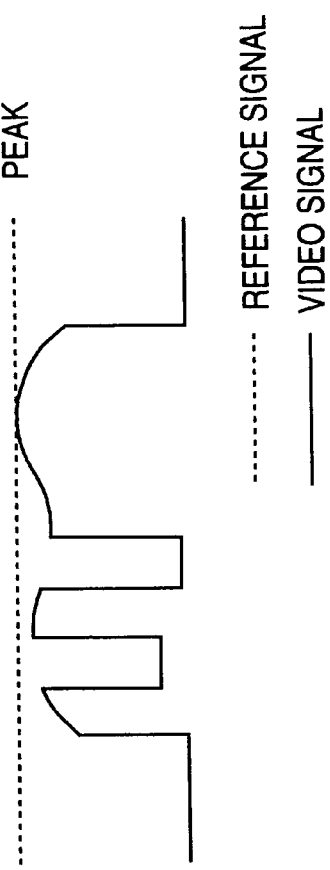
FIG. 5A–5C are diagrams showing the relationship among a reference signal, video signal and slice level when use is made of fixed shading data in the image processing apparatus of this embodiment.
Figure 5B:
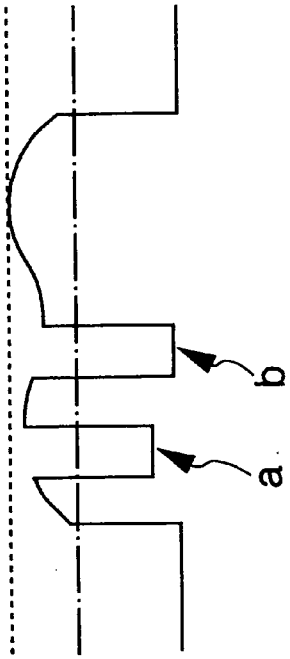
Figure 5C:
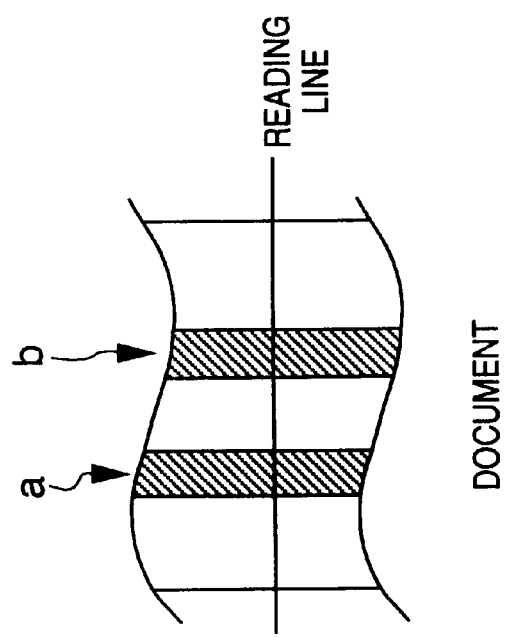
Figure 6:
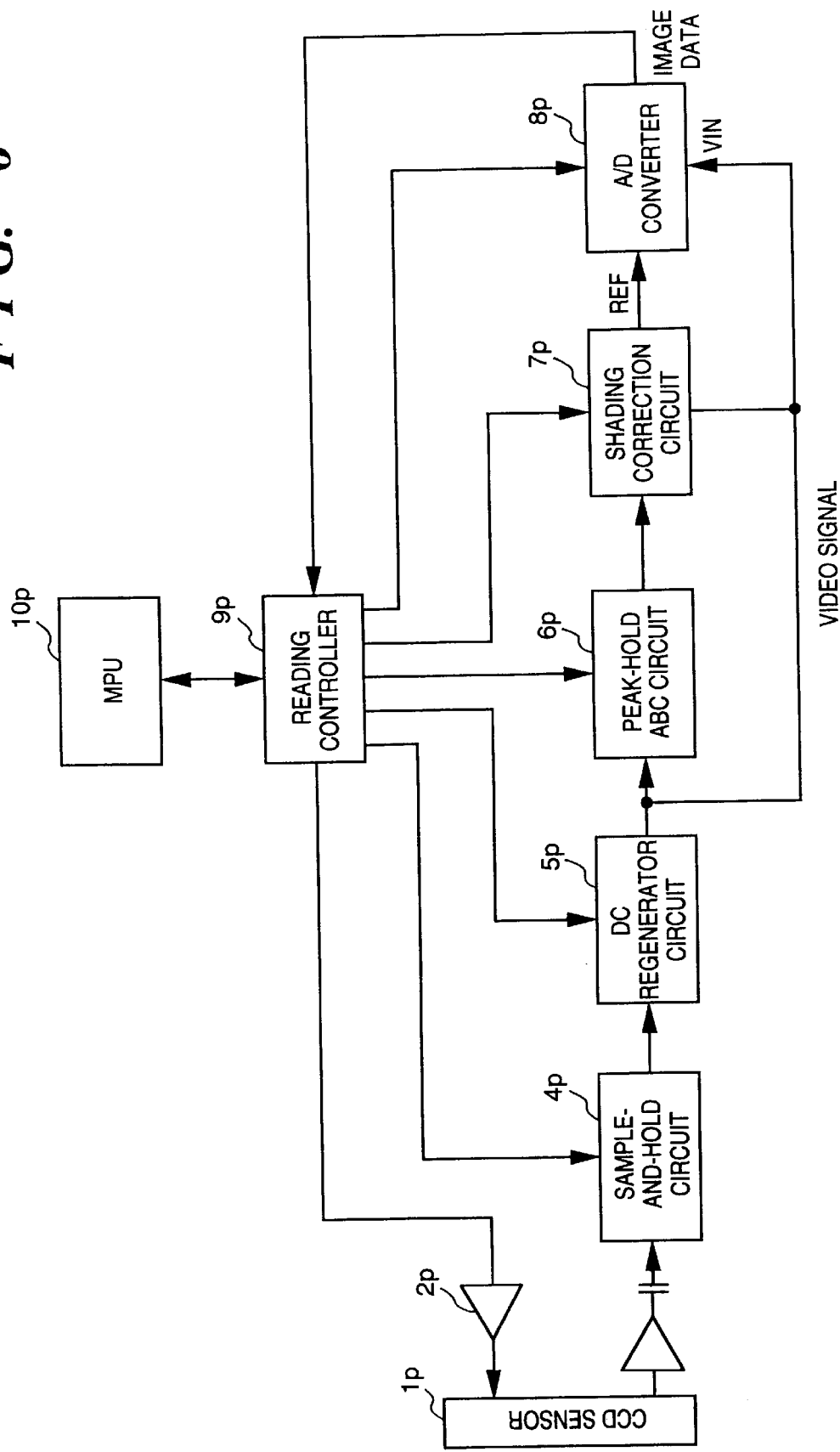
FIG. 6 is a block diagram showing the construction of an image processing apparatus according to the prior art.
Figure 7:
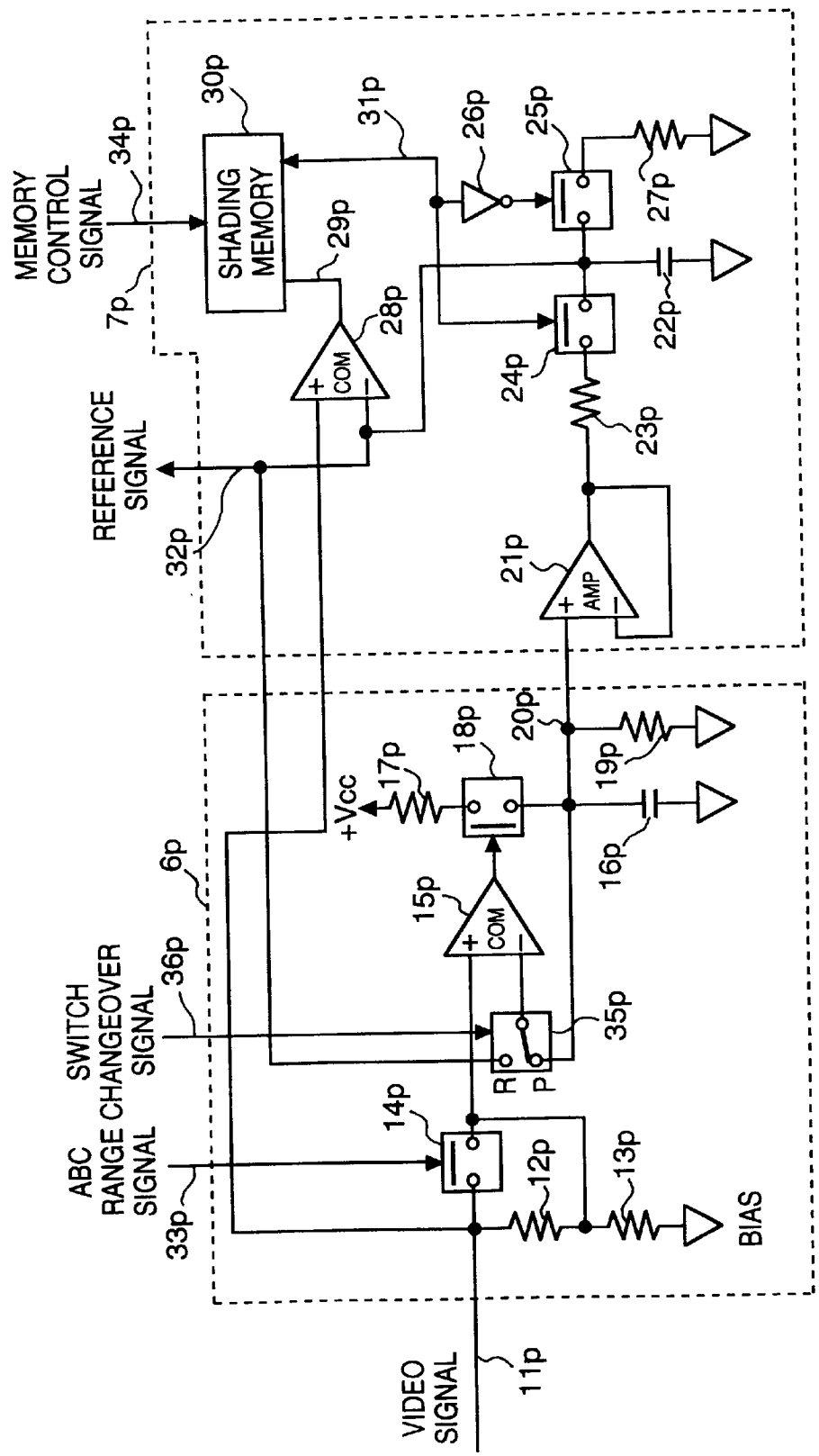
FIG. 7 is a block diagram showing the construction of a peak-hold ABC circuit and shading correction circuit in the image processing apparatus according to the prior art.
Figure 8B:
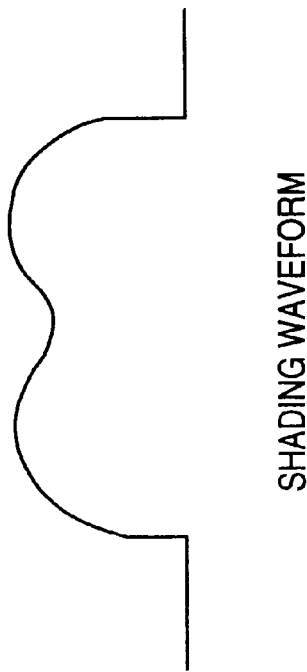
FIGS. 8A and 8B are diagrams schematically showing an operation for obtaining a shading waveform by the pre-scanning of white background (reference white background) in the image processing apparatus according to the prior art.
Figure 8A:
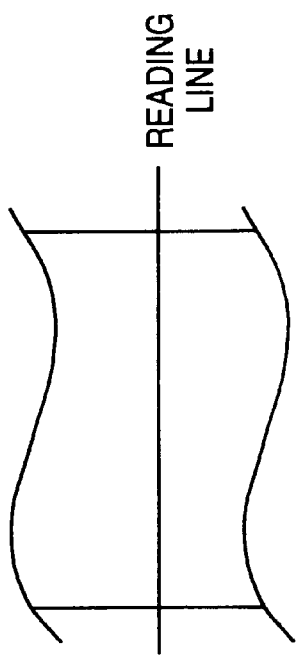
Figure 9A:
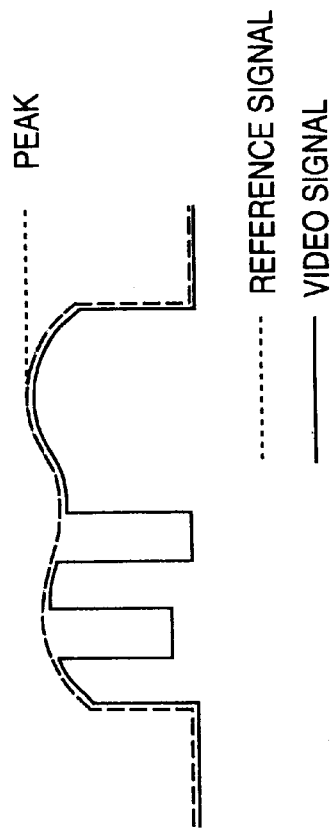
FIG. 9A–9C are diagram showing the relationship among a reference signal, video signal and slice level in the image processing apparatus according to the prior art.
Figure 9B:
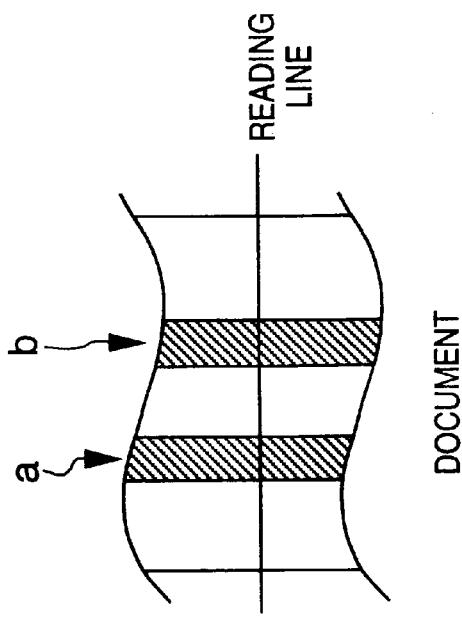
Figure 9C:
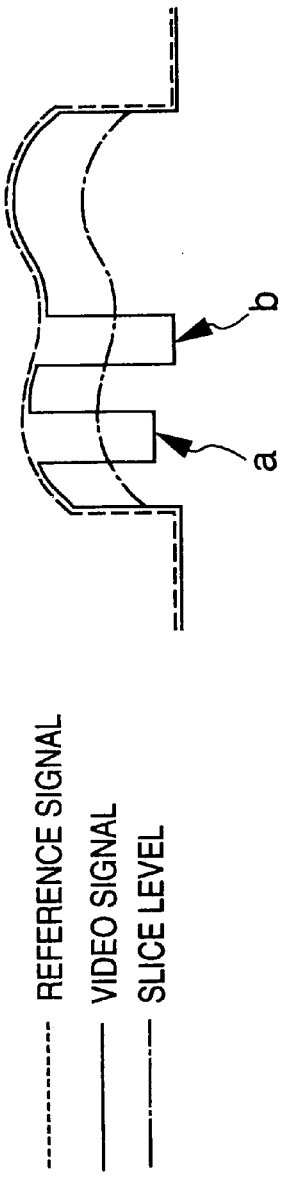

If it is found at step S405 that not all of the bits of data coincide, then it is determined at step S406 whether the reading mode is binary or not. If the mode is binary, then the reading controller 9 outputs a shading-data changeover signal 51 at step S407 so that the sixth analog switch 50 is switched over to the +Vcc side to enter logical "1" (high) into the third analog switch 24. As a result of this operation, the peak value of the document (image) which charges the peak-hold capacitor 16 is charged in the shading capacitor 22 via the third analog switch 24. More specifically, the shading waveform for performing the shading correction becomes a fixed-value waveform (a linear waveform) in which the peak value of the document is made linear. Accordingly, in case of a document in which a, b portions are black information, as shown in FIG. 5A, the reference signal 32 prevailing when the document is read becomes a linear waveform with respect to the peak value of the video signal 11, as illustrated in FIG. 5B. If 60% of the crest value of the reference signal is adopted as the slice level in the reading controller 9, then, in case of the document of FIG. 5A in which portions a and b are black information, the portions a, b will be lower than the slice level, as depicted in FIG. 5C, and will be judged to be portions of black information.

Next, the operation for reading the document is started at step S408. Specifically, the video signal 11 from the CS sensor 1 is subjected to image processing using the linear shading waveform based upon the peak value of the image. Next, it is determined at step S409 whether there is an ensuing page of a document to be read. If there is an ensuing page, the program returns to step S408; otherwise, this processing operation is terminated.

If it is found at step S405 that all bits of the data coincide, then the processing of steps S406, S407 is skipped and the operation for reading the document is started at step S408.

If it is found at step S406 that the reading mode is not the binary mode but the mode is judged to be the halftone mode, then the display unit 40 of FIG. 1 is made to display "HALFTONE MODE ERROR" at step S410. This is followed by step S411, at which the pre-scanning operation shown in FIG. 3 is performed again to create shading data anew, write this shading data in the shading memory 30 and write the checksum data in the checksum memory 39. The program then returns to step S401, at which reading of the document is carried out.

By thus eliminating a processing mechanism for the pre-scanning of white background (reference white background), the structure of the document reading mechanism is simplified and the cost of the apparatus can be reduced. In addition, the reliability of document feed is enhanced. In the event that shading data created by reading the document for white reference are destroyed by an abnormal voltage, shading data of a fixed value (the peak value of the image signal) are used instead of the above-mentioned shading data, thereby making it possible to output a normal image with regard to a binary image. In a case where a halftone image is read, shading data are created anew by performing pre-scanning again. As a result, a normal image can be outputted even with regard to a halftone image.

The present invention can be applied to a system constituted by a plurality of devices (e.g., a host computer, interface, reader, printer) or to an apparatus comprising a single device (e.g., a copying machine or facsimile machine).

Further, the object of the present invention can also be attained by providing a storage medium, which stores program codes for performing the aforesaid processes, in a system or apparatus, and reading out the program codes from the storage medium with the help of a computer (e.g., a CPU or MPU) of the system or apparatus so as to execute the program.

In this case, the program codes read out of the storage medium implement the functions according to the embodiment, and the storage medium storing the program codes constitutes the invention.

Further, the storage medium, such as a floppy disk, hard disk, optical disk, magneto-optical disk, CD-ROM, CD-R, magnetic tape, non-volatile memory card or ROM, can be used to provide the program codes.

Furthermore, besides the case where the aforesaid functions according to the embodiment are implemented by executing the program codes read by a computer, the present invention covers a case where an operating system (OS) or the like working on the computer performs a part of or the entire process in accordance with the designation of program codes and implements the functions according to the embodiment.

Furthermore, the present invention further includes a case where a CPU or the like contained in a function extension card or unit performs a part of or the entire expansion in accordance with the designation of program codes and implements the functions of the embodiment, this being done after the program codes read out of the storage medium are written in the function expansion card, which is inserted into a computer, or in a memory provided in the function expansion unit connected to the computer.

Figure 10:
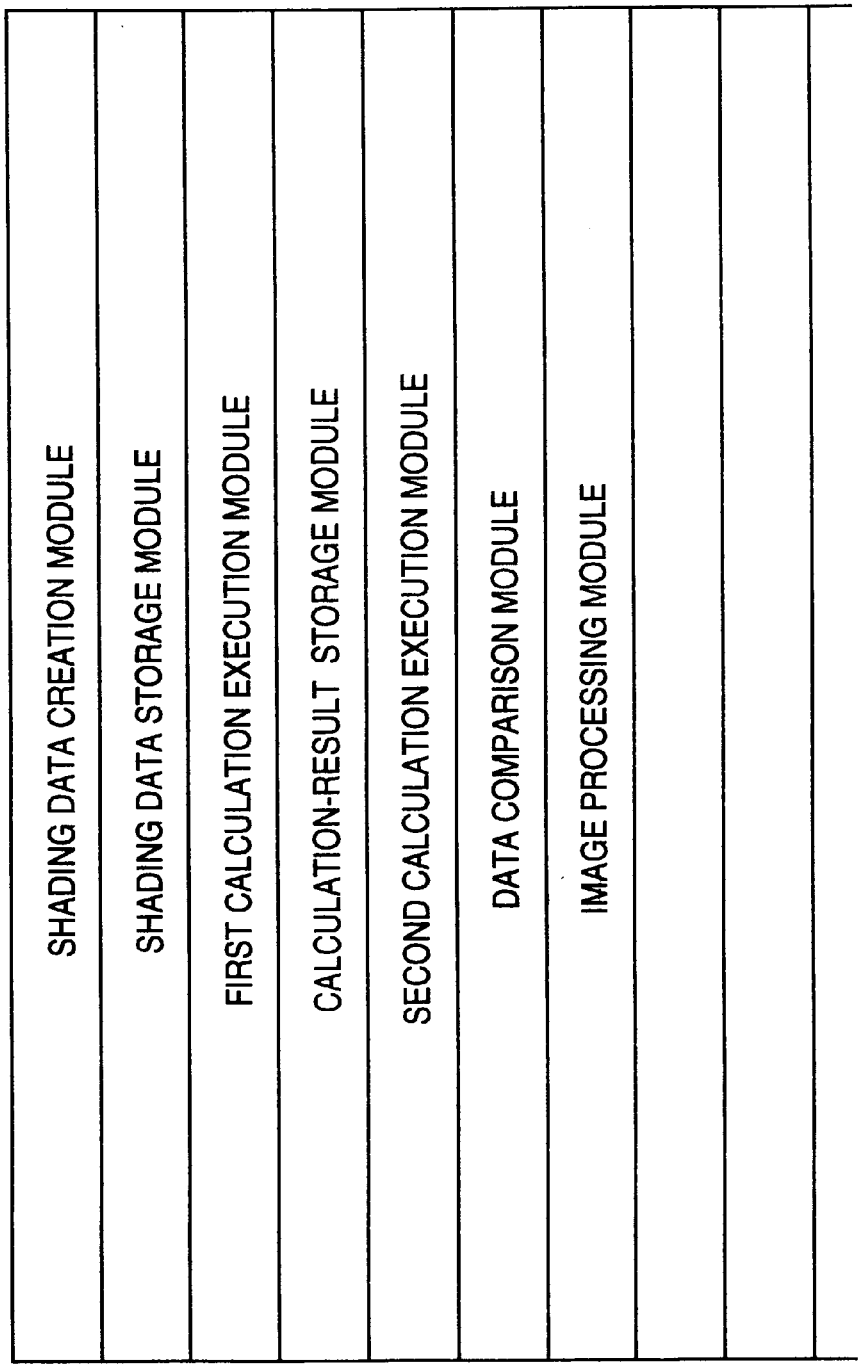
FIG. 10 is a diagram showing a memory map of a storage medium in a case where the present invention is applied to a computer program product.

In a case where the present invention is applied to the aforesaid storage medium, the storage medium stores the program codes corresponding to the flowcharts described in the embodiment. Briefly, the storage medium stores each module shown as an example of a memory map in FIG. 10. More specifically, at least program codes which correspond to a shading data creation module, a shading data storage module, a first calculation execution module, a calculation-result storage module, a second calculation execution module, a data comparison module and an image processing module are stored in the storage medium.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for electrically processing an image signal comprising:

first storing means for storing correction data to correct the image signal;

first converting means for converting the correction data into a first verification data before the correction data is stored in the first storing means;

second storing means for storing the first verification data;

second converting means for reading out the correction data, which has been stored in the first storing means, and converting the read out correction data into a second verification data; and comparing means for reading out the first verification data, which have been stored in said second storing means, and comparing the read out first verification data and the second verification data;

wherein image processing using the correction data is not executed and image processing using predetermined correction data having a value which is equal to a peak value of the image signal is executed in a case where the first verification data, which has been stored in said second storing means, and the second verification data are found not to coincide as a result of comparison of the data.

2. The apparatus according to claim 1, further comprising means for determining whether a mode for inputting the image signal is a binary image inputting mode or a halftone image inputting mode in a case where the first verification data stored in said second storing means and the second verification data are found not to coincide as a result of comparison of the data;

wherein correction data are created anew when the mode for inputting the image signal is the halftone image inputting mode.

3. The apparatus according to claim 2, further comprising display means for visually displaying the halftone image inputting mode as an error mode.

4. The apparatus according to claim 1, wherein said correction data are shading data.

5. The apparatus according to claim 1, further comprising creating means for creating the correction data based on the image signal.

6. The apparatus according to claim 1, further comprising inputting means for inputting the image signal.

7. The apparatus according to claim 6, wherein said inputting means has a inputting width equal to width of the image signal.

8. The apparatus according to claim 1, further comprising means for disabling rewriting of data that have been stored in said second storing means.

9. The apparatus according to claim 8, wherein said disabling of rewriting is performed by inhibiting access to said second storing means.

10. An image processing apparatus for electrically processing an image signal comprising:

first storing means for storing correction data to correct the image signal;

first converting means for converting the correction data into a first check sum data before the correction data is stored in the first storing means;

second storing means for storing the first check sum data;

second converting means for reading out the correction data, which has been stored in the first storing means, and converting the read out correction data into a second check sum data; and comparing means for reading out the first check sum data, which have been stored in said second storing means, and comparing the read out first check sum data and the second check sum data, wherein image processing using the correction data is not executed in a case where the first check sum data, which has been stored in said second storing means, and the second check sum data are found not to coincide as a result of comparison of the data.

11. The apparatus according to claim 10, further comprising inputting means for inputting the image signal.

12. The apparatus according to claim 11, wherein said inputting means has a inputting width equal to width of the image signal.

13. The apparatus according to claim 10, further comprising means for determining whether a mode for inputting the image signal is a binary image inputting mode or a halftone image inputting mode in a case where the first check sum data stored in said second storing means and the second check sum data are found not to coincide as a result of comparison of the data;

wherein correction data are created anew when the mode for inputting the image signal is the halftone image inputting mode.

14. The apparatus according to claim 13, further comprising display means for visually displaying the halftone image inputting mode as an error mode.

15. The apparatus according to claim 10, further comprising means for disabling rewriting of data that have been stored in said second storing means.

16. The apparatus according to claim 15, wherein said disabling of rewriting is performed by inhibiting access to said second storing means.

17. The apparatus according to claim 10, wherein image processing using predetermined correction data is executed in a case where the first check sum data stored in said second storing means and the second check sum data are found not to coincide as a result of comparison of the data.

18. The apparatus according to claim 17, further comprising means for determining whether a mode for inputting the image signal is a binary image inputting mode or a halftone image inputting mode in a case where the first check sum data stored in said second storing means and the second check sum data are found not to coincide as a result of comparison of the data;

wherein image processing using the predetermined correction data is executed when the mode for inputting the image signal is the binary image inputting mode.

19. The apparatus according to claim 17, wherein the predetermined correction data are data having a fixed value.

20. The apparatus according to claim 17, wherein the predetermined correction data are data having a value equal to a peak value of the image signal.

21. An image processing method for electrically processing an image signal comprising:

a first storing step of storing correction data to correct the image signal;

a first converting step of converting the correction data into a first verification data before the correction data is stored at a first storing step;

a second storing step of storing the first verification data;

a second converting step of reading out the correction data, which has been stored, and converting the read out correction data into a second verification data; and a step of reading out the first verification data stored at said second storing step and comparing the read out first verification data and the second verification data;

wherein image processing using the correction data is not executed and image processing using predetermined correction data having a value which is equal to a peak value of the image signal is executed in a case where the first verification data stored at said second storing step and the second verification data are found not to coincide as a result of comparison of the data.

22. The method according to claim 21, further comprising a inputting step of inputting the image signal.

23. The method according to claim 21, further comprising a creating step of creating the correction data based on the image signal.

24. The method according to claim 21, further comprising a disabling step of disabling rewriting of data that have been stored at said second storing step.

25. The method according to claim 21, further comprising a determining step of determining whether a mode for inputting the image signal is a binary image inputting mode or a halftone image inputting mode in a case where the first verification data stored at said second storing step and the second verification data are found not to coincide as a result of comparison of the data;

wherein image processing using the predetermined correction data is executed when the mode for inputting the image signal is the binary image inputting mode.

26. The method according to claim 21, further comprising a determining step of determining whether a mode for inputting the image signal is a binary image inputting mode or a halftone image inputting mode in a case where the first verification data stored at said second storing step and the second verification data are found not to coincide as a result of comparison of the data;

wherein correction data are created anew when the mode for inputting the image signal is the halftone image inputting mode.

27. The method according to claim 26, further comprising a displaying step of visually displaying the halftone image inputting mode as an error mode.

28. A computer program product, which is constituted by a computer-usable medium having computer-readable program codes stored thereon, for electrically processing and outputting an image signal comprising:

computer-readable program code means for operating a computer so as to store correction data in a first memory to correct the image signal;

computer-readable program code means for operating the computer so as to convert the correction data into a first verification data before the correction data is stored in the first memory;

computer-readable program code means for operating the computer so as to store the first verification data in a second memory;

computer-readable program code means for operating the computer so as to read out the correction data, which has been stored in the first memory, and convert the read out correction data into a second verification data;

computer-readable program code means for operating the computer so as to read out the first verification data, which has been stored in said second memory, and compare the read out first verification data and the second verification data; and computer-readable program code means for operating the computer in such a manner that image processing using the correction data is not executed and image processing using predetermined correction data having a value which is equal to a peak value of the image signal is executed in a case where the first verification data, which has been stored in said second memory, and the second verification data are not found to coincide as a result of comparison of the data.

29. The computer program product according to claim 28, further comprising computer-readable program code means for operating a computer so as to input the image signal.

30. The computer program product according to claim 28, further comprising computer-readable program code means for operating a computer so as to create the correction data based on the image signal.

31. The computer program product according to claim 28, further comprising computer-readable program code means for operating a computer so as to disable rewriting of data that have been stored in the second memory.

32. The computer program product according to claim 28, further comprising computer-readable program code means for operating a computer so as to determine whether a mode for inputting the image signal is a binary image inputting mode or a halftone image inputting mode in a case where the first verification data stored in the second memory and the second verification data are found not to coincide as a result of comparison of the data;

wherein image processing using the predetermined correction data is executed when the mode for inputting the image signal is the binary inputting mode.

33. The computer program according to claim 28, further comprising computer-readable program code means for operating a computer so as to determine whether a mode for inputting the image signal is a binary image inputting mode or a halftone image inputting mode in a case where the first verification data stored in the second memory and the second verification data are found not to coincide as a result of comparison of the data;

wherein correction data are created anew when the mode for inputting the image signal is the halftone image inputting mode.

34. The computer program product according to claim 33, further comprising computer-readable program code means for operating a computer so as to visually display the halftone image inputting mode as an error mode.

35. An image processing method for electrically processing an image signal comprising:

a first storing step of storing correction data to correct the image signal;

a first converting step of converting the correction data into a first check sum data before the correction data is stored at a first storing step;

a second storing step of storing the first check sum data;

a second converting step of reading out the correction data, which has been stored, and converting the read out correction data into a second check sum data; and a step of reading out the first check sum data stored at said second storing step and comparing the read out first check sum data and the second check sum data;

wherein image processing using the correction data is not executed in a case where the first check sum data stored at said second storing step and the second check sum data are found not to coincide as a result of comparison of the data.

36. The method according to claim 35, further comprising a disabling step of disabling rewriting of data that have been stored at said second storing step.

37. The method according to claim 35, further comprising a determining step of determining whether a mode for inputting the image signal is a binary image inputting mode or a halftone image inputting mode in a case where the first check sum data stored at said second storing step and the second check sum data are found not to coincide as a result of comparison of the data;

wherein correction data are created anew when the mode for inputting the image signal is the halftone image inputting mode.

38. The method according to claim 37, further comprising a displaying step of visually displaying the halftone image inputting mode as an error mode.

39. The method according to claim 35, wherein image processing using predetermined correction data is executed in a case where the first check sum data stored at said second storing step and the second check sum data are found not to coincide as a result of comparison of the data.

40. The method according to claim 39, wherein the predetermined correction data are data having a fixed value.

41. The method according to claim 39, wherein the predetermined correction data are data having a value equal to a peak value of the image signal.

42. The method according to claim 39, further comprising a determining step of determining whether a mode for inputting the image signal is a binary image inputting mode or a halftone image inputting mode in a case where the first check sum data stored at said second storing step and the second check sum data are found not to coincide as a result of comparison of the data;

wherein image processing using the predetermined correction data is executed when the mode for inputting the image signal is the binary image inputting mode.

43. A computer program product, which is constituted by a computer-usable medium having a computer-readable program codes stored thereon, for electrically processing and outputting an image signal comprising:

computer-readable program code means for operating a computer so as to store correction data in a first memory to correct the image signal;

computer-readable program code means for operating the computer so as to convert the correction data into a first check sum data before the correction data is stored in the first memory;

computer-readable program code means for operating the computer so as to store the first check sum data in a second memory;

computer-readable program code means for operating the computer so as to read out the correction data, which has been stored in the first memory, and convert the read out correction data into a second check sum data;

computer-readable program code means for operating the computer so as to read out the first check sum data, which has been stored in said second memory, and compare the read out first check sum data and the second check sum data; and computer-readable program code means for operating the computer in such a manner that image processing using the correction data is not executed in a case where the first check sum data, which has been stored in said second memory, and the second check sum data are not found to coincide as a result of comparison of the data.

44. The computer program product according to claim 43, further comprising computer-readable program code means for operating a computer so as to disable rewriting of data that have been stored in the second memory.

45. The computer program product according to claim 43, further comprising computer-readable program code means for operating a computer so as to determine whether a mode for inputting the image signal is a binary image inputting mode or a halftone image inputting mode in a case where the first check sum data stored in the second memory and the second check sum data are found not to coincide as a result of comparison of the data;

wherein correction data are created anew when the mode for inputting the image signal is the halftone image inputting mode.

46. The computer program product according to claim 45, further comprising computer-readable program code means for operating a computer so as to visually display the halftone image inputting mode as an error mode.

47. The computer program product according to claim 43, wherein image processing using predetermined correction data is executed in a case where the first check sum data stored in the second memory and the second check sum data are found not to coincide as a result of comparison of the data.

48. The computer program product according to claim 47, wherein the predetermined correction data are data having a fixed value.

49. The computer program product according to claim 47, wherein the predetermined correction data are data having a value equal to a peak value of the image signal.

50. The computer program product according to claim 47, further comprising computer-readable program code means for operating a computer so as to determine whether a mode for inputting the image signal is a binary image inputting mode or a halftone image inputting mode in a case where the first check sum data stored in the second memory and the second check sum data are found not to coincide as a result of comparison of the data;

wherein image processing using the predetermined correction data is executed when the mode for inputting the image signal is the binary image inputting mode.

51. The apparatus according to claim 1, further comprising means for determining whether a mode for inputting the image signal is a binary image inputting mode or a halftone image inputting mode in a case where the first verification data stored in said second storing means and the second verification data are found not to coincide as a result of comparison of the data;

wherein image processing using the predetermined correction data is executed when the mode for inputting the image signal is the binary image inputting mode.

\* \* \* \* \*